United States Patent
Martick

(10) Patent No.: US 10,938,949 B2
(45) Date of Patent: Mar. 2, 2021

(54) NOTIFICATIONS BASED ON QUEUES

(71) Applicant: SAP SE, Walldorf (DE)

(72) Inventor: Christian Martick, Berlin (DE)

(73) Assignee: SAP SE, Walldorf (DE)

( * ) Notice: Subject to any disclaimer, the term of this patent is extended or adjusted under 35 U.S.C. 154(b) by 256 days.

(21) Appl. No.: 15/985,631

(22) Filed: May 21, 2018

(65) Prior Publication Data

US 2019/0356755 A1 Nov. 21, 2019

(51) Int. Cl.
*H04L 29/08* (2006.01)
*H04L 12/58* (2006.01)

(52) U.S. Cl.
CPC ............ *H04L 67/325* (2013.01); *H04L 51/24* (2013.01)

(58) Field of Classification Search
CPC .............................. H04L 67/325; H04L 51/24
See application file for complete search history.

(56) References Cited

U.S. PATENT DOCUMENTS

| | | | | |
|---|---|---|---|---|
| 10,110,536 B2* | 10/2018 | Vincent | ................... | H04L 51/24 |
| 2003/0097485 A1* | 5/2003 | Horvitz | ................. | G06F 21/335 |
| | | | | 719/313 |
| 2004/0254998 A1* | 12/2004 | Horvitz | ................ | G06Q 10/107 |
| | | | | 709/206 |
| 2005/0050148 A1* | 3/2005 | Mohammadioun | ... | H04L 1/1877 |
| | | | | 709/206 |
| 2005/0076089 A1* | 4/2005 | Fonseca | ............. | H04L 12/1859 |
| | | | | 709/206 |
| 2005/0278366 A1* | 12/2005 | Horvitz | .................. | G06F 21/335 |
| 2014/0189030 A1* | 7/2014 | Benchenaa | ............. | H04L 51/24 |
| | | | | 709/207 |
| 2015/0249632 A1* | 9/2015 | Barrand | .................. | H04L 51/24 |
| | | | | 709/206 |
| 2017/0339536 A1* | 11/2017 | Lewis | ..................... | H04W 4/80 |
| 2018/0270179 A1* | 9/2018 | Wren | ..................... | H04L 67/26 |

* cited by examiner

*Primary Examiner* — Benjamin M Thieu
(74) *Attorney, Agent, or Firm* — Fountainhead Law Group P.C.

(57) ABSTRACT

Some embodiments provide a non-transitory machine-readable medium that stores a program. The program receives, from an application, a request to schedule a notification. The program further generates a pending notification. The program also stores the pending notification in a queue. The program further periodically iterates through the queue to check whether an expiration time of the pending notification has elapsed. Upon determining that the expiration time of the pending notification has elapsed, the program also deletes the pending notification from the queue without processing the pending notification. Upon receiving from the application a second set of interactions performed on the application that matches the defined set of interactions specified in the pending notification, the program further processes the pending notification by sending the recipient specified in the pending notification a notification comprising the message specified in the pending notification.

20 Claims, 8 Drawing Sheets

| ID | Metadata | Pattern Descriptor | |
|---|---|---|---|
| 1 | Application: webUI | Name: Page_Refresh; Pattern Event: refresh; Pattern Type: jquery; Pattern Target: document | ← 220 |
| 2 | Application: webUI | Name: Click_Chat; Pattern Event: click; Pattern Type: jquery; Pattern Target: chat-content | ← 225 |

FIG. 2

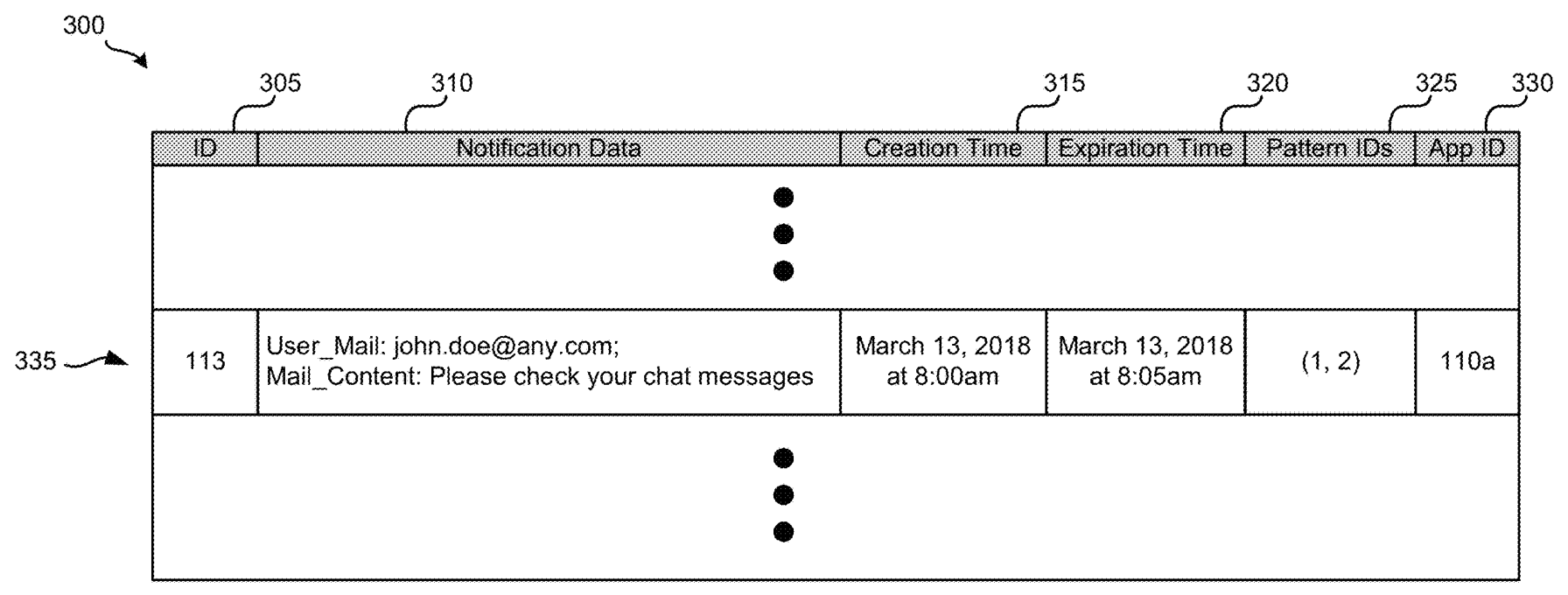

| ID | Notification Data | Creation Time | Expiration Time | Pattern IDs | App ID |
|---|---|---|---|---|---|
| 113 | User_Mail: john.doe@any.com; Mail_Content: Please check your chat messages | March 13, 2018 at 8:00am | March 13, 2018 at 8:05am | (1, 2) | 110a |

FIG. 3

| ID | Notification Data | Creation Time | Expiration Time | Pattern IDs | App ID |
|---|---|---|---|---|---|
| 114 | User_Mail: jane.doe@any.com; Mail_Content: Please check your chat messages | March 13, 2018 at 8:00am | March 13, 2018 at 8:05am | (1, 2) | 110b |

FIG. 4

NOTIFICATIONS BASED ON QUEUES

BACKGROUND

Many applications operating on computing devices provide graphical user interfaces (GUIs) for users of the computing devices to interact with the applications. For example, such applications may provide GUIs that allow users to provide input—such as keyboard inputs, mouse inputs, microphone inputs, camera inputs, etc. —to the applications. Additionally, users may receive output from the applications via the GUI in the form of text, images, videos, audio, etc. The applications may also provide various notifications to the user in order to communicate information to the users (e.g., reminders, warnings, etc.).

SUMMARY

In some embodiments, a non-transitory machine-readable medium stores a program. The program receives, from an application, a request to schedule a notification. The request includes a recipient, a message, a time value, and a first set of interactions. The program further generates a pending notification that includes the recipient, the message, a defined set of interactions that corresponds to the first set of interactions, a creation time that represents a time at which the pending notification is generated, and an expiration time that represents a sum of the creation time and the time value. The program also stores the pending notification in a queue. The program further periodically iterates through the queue to check whether the expiration time of the pending notification has elapsed. Upon determining that the expiration time of the pending notification has elapsed, the program also deletes the pending notification from the queue without processing the pending notification. Upon receiving from the application a second set of interactions performed on the application that matches the defined set of interactions specified in the pending notification, the program further processes the pending notification by sending the recipient specified in the pending notification a notification comprising the message specified in the pending notification.

In some embodiments, in response to the request, the program may further access a storage configured to store defined sets of interactions to identify the defined set of interactions that corresponds to the first set of interactions and determine a unique identifier associated with the defined set of interactions. The defined set of interactions included in the pending notification may be the determined unique identifier associated with the defined set of interactions. The program may also determine that the second set of interactions performed on the application matches the defined set of interactions. The unique identifier may be a first unique identifier and the defined set of interactions may be a first defined set of interactions. Determining that the second set of interactions performed on the application matches the defined set of interactions may include accessing the storage to identify a second defined set of interactions that corresponds to the second set of interactions, determining a second unique identifier associated with the second defined set of interactions and determining that the second unique identifier matches the first unique identifier.

In some embodiments, the request to schedule the notification may be a first request to schedule a first notification, the recipient may be a first recipient, the message may be a first message, the time value may be a first time value, the pending notification may be a first pending notification, the defined set of interactions may be a first defined set of interactions, the creation time may be a first creation time, the expiration time may be a first expiration time, and the notification may be a first notification. The program may further receiving, from the application, a second request to schedule a second notification. The second request may include a second recipient, a second message, a second time value, and a third set of interactions. The program may also generate a second pending notification comprising the second recipient, the second message, a second defined set of interactions that corresponds to the third set of interactions, a second creation time that represents a time at which the second pending notification is generated, a second expiration time that represents a sum of the second creation time and the second time value. The program may further store the second pending notification in the queue. The program may also periodically iterate through the queue to check whether the second expiration time of the second pending notification has elapsed. Upon determining that the second expiration time of the second pending notification has elapsed, the program may further delete the second pending notification from the queue without processing the second pending notification. Upon receiving from the application a fourth set of interactions performed on the application that matches the second defined set of interactions specified in the second pending notification, the program may also process the second pending notification by sending the second recipient specified in the second pending notification a second notification comprising the second message specified in the second pending notification.

In some embodiments, the request may further include a third set of interactions. The defined set of interactions may be a first defined set of interactions. The pending notification may further include a second defined set of interactions that corresponds to the third set of interactions. Upon receiving from the application the second set of interactions performed on the application that matches the second defined set of interactions specified in the pending notification, the program may further process the pending notification by sending the recipient specified in the pending notification the notification comprising the message specified in the pending notification. The application may be a first application. The program may further receiving from a second application a set of interaction definitions. Each interaction definition in the set of interaction definitions may include a set of interactions and metadata associated with the set of interactions. The program may also store the set of interaction definitions in a storage.

In some embodiments, a method receives, from an application, a request to schedule a notification. The request includes a recipient, a message, a time value, and a first set of interactions. The method further generates a pending notification that includes the recipient, the message, a defined set of interactions that corresponds to the first set of interactions, a creation time that represents a time at which the pending notification is generated, and an expiration time that represents a sum of the creation time and the time value. The method also stores the pending notification in a queue. The method further periodically iterates through the queue to check whether the expiration time of the pending notification has elapsed. Upon determining that the expiration time of the pending notification has elapsed, the method also deletes the pending notification from the queue without processing the pending notification. Upon receiving from the application a second set of interactions performed on the application that matches the defined set of interactions specified in the pending notification, the method further processes the pending notification by sending the recipient specified in the pending notification a notification comprising the message specified in the pending notification.

In some embodiments, in response to the request, the method may further access a storage configured to store defined sets of interactions to identify the defined set of interactions that corresponds to the first set of interactions and determine a unique identifier associated with the defined set of interactions. The defined set of interactions included in the pending notification may be the determined unique identifier associated with the defined set of interactions. The method may also determine that the second set of interactions performed on the application matches the defined set of interactions. The unique identifier may be a first unique identifier and the defined set of interactions may be a first defined set of interactions. Determining that the second set of interactions performed on the application matches the defined set of interactions may include accessing the storage to identify a second defined set of interactions that corresponds to the second set of interactions, determining a second unique identifier associated with the second defined set of interactions, and determining that the second unique identifier matches the first unique identifier.

In some embodiments, the request to schedule the notification may be a first request to schedule a first notification, the recipient may be a first recipient, the message may be a first message, the time value may be a first time value, the pending notification may be a first pending notification, the defined set of interactions may be a first defined set of interactions, the creation time may be a first creation time, the expiration time may be a first expiration time, and the notification may be a first notification. The method may further receive, from the application, a second request to schedule a second notification. The second request may include a second recipient, a second message, a second time value, and a third set of interactions. The method may also generate a second pending notification comprising the second recipient, the second message, a second defined set of interactions that corresponds to the third set of interactions, a second creation time that represents a time at which the second pending notification is generated, a second expiration time that represents a sum of the second creation time and the second time value. The method may further store the second pending notification in the queue. The method may also periodically iterate through the queue to check whether the second expiration time of the second pending notification has elapsed. Upon determining that the second expiration time of the second pending notification has elapsed, the method may further delete the second pending notification from the queue without processing the second pending notification. Upon receiving from the application a fourth set of interactions performed on the application that matches the second defined set of interactions specified in the second pending notification, the method may also process the second pending notification by sending the second recipient specified in the second pending notification a second notification comprising the second message specified in the second pending notification.

In some embodiments, the request may further include a third set of interactions. The defined set of interactions may be a first defined set of interactions. The pending notification may further include a second defined set of interactions that corresponds to the third set of interactions. Upon receiving from the application the second set of interactions performed on the application that matches the second defined set of interactions specified in the pending notification, the method may further process the pending notification by sending the recipient specified in the pending notification the notification comprising the message specified in the pending notification. The application may be a first application. The method may further receive from a second application a set of interaction definitions. Each interaction definition in the set of interaction definitions may include a set of interactions and metadata associated with the set of interactions. The method may also store the set of interaction definitions in a storage.

In some embodiments, a system includes a set of processing units and a non-transitory machine-readable medium that stores instructions. The instructions cause at least one processing unit to receive, from an application, a request to schedule a notification. The request comprising a recipient, a message, a time value, and a first set of interactions. The instructions further cause the at least one processing unit to generate a pending notification comprising the recipient, the message, a defined set of interactions that corresponds to the first set of interactions, a creation time that represents a time at which the pending notification is generated, and an expiration time that represents a sum of the creation time and the time value. The instructions also cause the at least one processing unit to store the pending notification in a queue. The instructions further cause the at least one processing unit to periodically iterate through the queue to check whether the expiration time of the pending notification has elapsed. Upon determining that the expiration time of the pending notification has elapsed, the instructions also cause the at least one processing unit to delete the pending notification from the queue without processing the pending notification. Upon receiving from the application a second set of interactions performed on the application that matches the defined set of interactions specified in the pending notification, the instructions further cause the at least one processing unit to process the pending notification by sending the recipient specified in the pending notification a notification comprising the message specified in the pending notification.

In some embodiments, in response to the request, the instructions may further cause the at least one processing units to access a storage configured to store defined sets of interactions to identify the defined set of interactions that corresponds to the first set of interactions and determine a unique identifier associated with the defined set of interactions. The defined set of interactions included in the pending notification may be the determined unique identifier associated with the defined set of interactions. The instructions may further cause the at least one processing unit to determine that the second set of interactions performed on the application matches the defined set of interactions. The unique identifier may be a first unique identifier and the defined set of interactions may be a first defined set of interactions. Determining that the second set of interactions performed on the application matches the defined set of interactions may include accessing the storage to identify a second defined set of interactions that corresponds to the second set of interactions, determining a second unique identifier associated with the second defined set of interactions, and determining that the second unique identifier matches the first unique identifier.

In some embodiments, the request to schedule the notification may be a first request to schedule a first notification, the recipient may be a first recipient, the message may be a first message, the time value may be a first time value, the pending notification may be a first pending notification, the defined set of interactions may be a first defined set of interactions, the creation time may be a first creation time, the expiration time may be a first expiration time, and the notification may be a first notification. The instructions may further cause the at least one processing unit to receive, from the application, a second request to schedule a second notification. The second request may include a second recipient, a second message, a second time value, and a third set of interactions. The instructions may also cause the at least one processing unit to generate a second pending notification comprising the second recipient, the second message, a second defined set of interactions that corresponds to the third set of interactions, a second creation time that represents a time at which the second pending notification is generated, a second expiration time that represents a sum of the second creation time and the second time value. The instructions may further cause the at least one processing unit to store the second pending notification in the queue. The instructions may also cause the at least one processing unit to periodically iterate through the queue to check whether the second expiration time of the second pending notification has elapsed. Upon determining that the second expiration time of the second pending notification has elapsed, the instructions may further cause the at least one processing unit to delete the second pending notification from the queue without processing the second pending notification. Upon receiving from the application a fourth set of interactions performed on the application that matches the second defined set of interactions specified in the second pending notification, the instructions may also cause the at least one processing unit to process the second pending notification by sending the second recipient specified in the second pending notification a second notification comprising the second message specified in the second pending notification.

In some embodiments, the request may further include a third set of interactions. The defined set of interactions may be a first defined set of interactions. The pending notification may further include a second defined set of interactions that corresponds to the third set of interactions. Upon receiving from the application the second set of interactions performed on the application that matches the second defined set of interactions specified in the pending notification, the instructions may further cause the at least one processing unit to process the pending notification by sending the recipient specified in the pending notification the notification comprising the message specified in the pending notification.

The following detailed description and accompanying drawings provide a better understanding of the nature and advantages of the present invention.

BRIEF DESCRIPTION OF THE DRAWINGS

FIG. 2 illustrates a table of example sets of defined interaction patterns according to some embodiments.

FIG. 3 illustrates an example notification queue according to some embodiments.

FIG. 4 illustrates the example notification queue illustrated in FIG. 3 after a pending notification has been canceled according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing notifications to applications based on a queue. In some embodiments, a system includes a notification manager and one or more applications. The notification manager provides a framework for providing notifications to the one or more applications. When certain events occur on an application, the application may send the notification manager a request for a notification, conditions that, when met, cause the notification manager to provide the notification, and conditions that, when met, cause the notification manager to cancel the notification. In response, the notification manager creates the notification and stores it in a queue. Periodically, the notification manager iterates through each notification in the queue to determine whether the conditions for providing the notification has been met. If so, the notification manager provides the notification to the specified recipient(s) in the specified manner (e.g., via email, text message, a pop-up window, etc.) and then deletes the notification from the queue. The notification manager can receive from the application information indicating that the conditions for canceling the notification are satisfied. In response, the notification manager cancels the notification by deleting it from the queue.

The techniques described in the present application provide a number of benefits and advantages over conventional methodologies for providing notifications. First, allowing notifications to be canceled when certain conditions are met reduces redundant or meaningless notifications and allows only relevant and/or useful notifications to be provided. Second, the notification framework is extensible because it allows any number of different conditions to be specified for canceling notifications, any number of different conditions to be specified for providing notifications. Further, the notification framework is also extensible because any number of different types of input may be used (e.g., keyboard inputs, pointing device inputs, gesture inputs, facial expression inputs, etc.)

Figure 1:
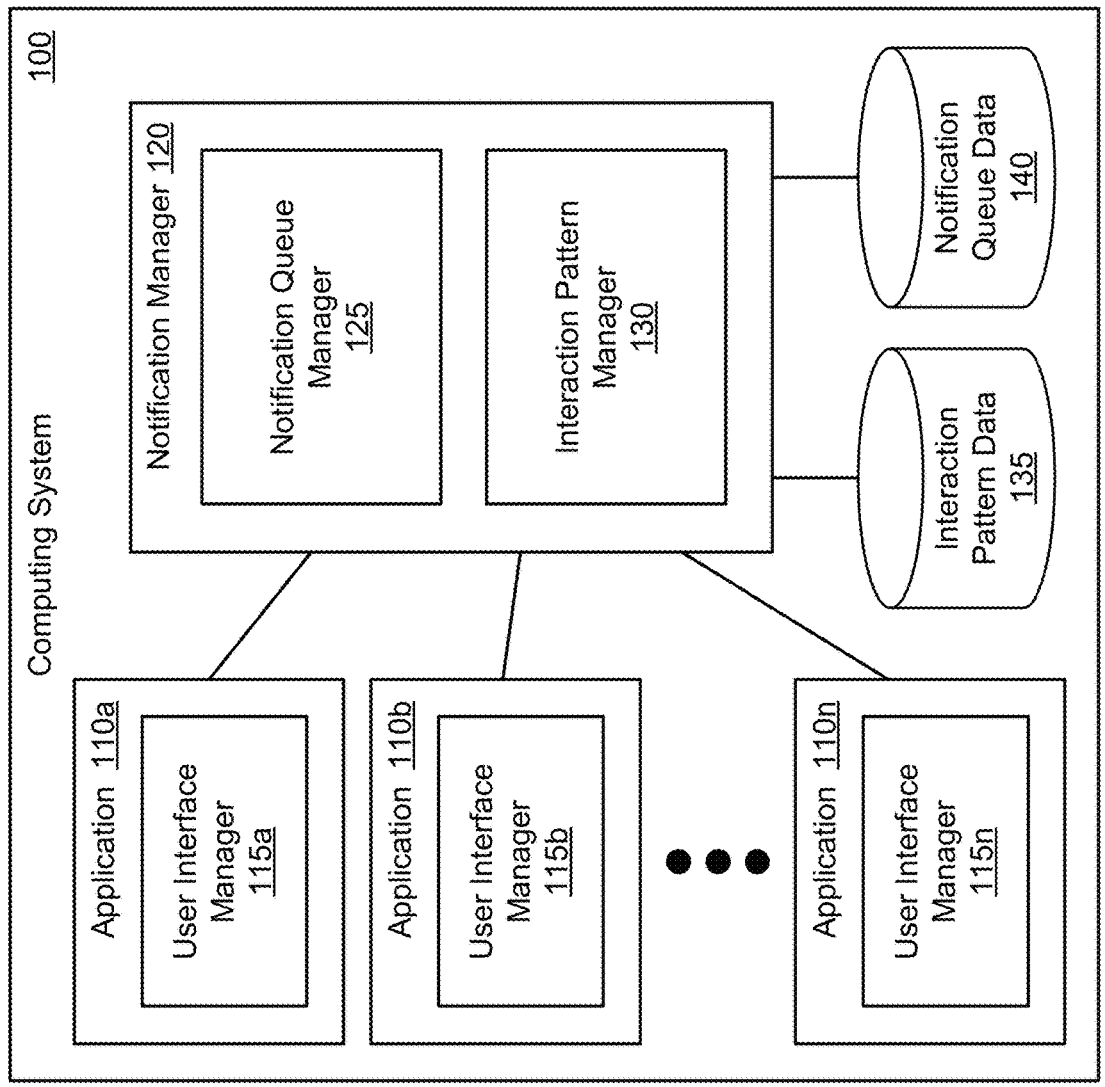
FIG. 1 illustrates a computing system for providing notifications according to some embodiments.

FIG. 1 illustrates a computing system 100 for providing notifications according to some embodiments. As shown, computing system 100 includes applications 110a-110n, notification manager 120, and storages 135 and 140. Interaction pattern data storage 135 is configured to store sets of defined interaction patterns. In some embodiments, a set of defined interaction patterns may specify one or more interactions that can be performed on an application 110 and/or one or more events that can occur in an application 110. Notification queue data storage 140 is used to implement a queue configured to store notifications. In some embodiments, storages 135 and 140 are implemented in a single physical storage while, in other embodiments, storages 135 and 140 may be implemented across several physical storages. While FIG. 1 shows storages 135 and 140 as part of computing system 100, one of ordinary skill in the art will appreciate that storage 135, storage 140, or both storages 135 and 140, may be external to computing system 100 in some embodiments.

Applications 110a-110n are software applications configured to employ notification manager 120 to provide notifications for applications 110a-110n. Applications 110a-110n may be any type of software application such as, for example, a word processing application, a spreadsheet application, an email application, a personal information management application, a messaging application, a media editing application, a web browsing application, a video game application, etc. As illustrated in FIG. 1, each of the applications 110a-110n includes a user interface manager 115.

Each user interface manager 115 is configured to provide graphical user interfaces (GUIs) for the respective application 110. The GUIs allow users of applications 110a-10n to interact with them. For example, users of applications 110 can provide applications 110a-110n with data, commands, requests, etc. through the GUIs. For instance, a user of an application 110 may request to register a set of interaction patterns. Further, the applications 110a-110n can provide the users with various outputs (e.g., text, images, videos, audio, etc.) via the GUIs.

Additionally, each user interface manager 115 translates interactions performed on GUIs provided by the respective application 110 and events that occur in the respective application 110 into defined interactions specified by notification manager 120. For example, when a user interface manager 115 receives an interaction performed on a GUI provided by the respective application 110 or the user interface manager 115 detects an event that occurred in the application 110, the user interface manager 115 translates the received interaction or event to a defined interaction specified by notification manager 120. In some embodiments, user interface manager 115 uses a lookup table of mappings between interactions performed on GUIs provided by the respective application 110 or events that occurred in the application 110 and defined interactions specified by notification manager 120 in order to translate the received interaction or event to the defined interaction specified by notification manager 120.

In some instances, an application 110 may want to schedule a notification with notification manager 120. For instance, an application 110 may send notification manager 120 a request to schedule a notification. In some embodiments, the request specifies a recipient of the notification, a message for the notification, a time value that represents an amount of time after scheduling the notification in which to provide the notification, and one or more sets of interactions or events that causes the notification to be canceled (also referred to as sets of conditions for canceling the notification). The recipient of the notification may be an email address, a telephone or mobile number, an application identifier (ID), etc., or any other type of data for identifying a recipient.

Notification manager 120 is responsible for managing notifications for applications 110a-110n. As shown in FIG. 1, notification manager 120 includes notification queue manager 125 and interaction pattern manager 130. Notification queue manager 125 handles requests to schedule notifications. When notification queue manager 125 receives a request to schedule a notification from an application 110, notification queue manager 125 generates a pending notification and stores it in notification queue data storage 140. As mentioned above, in some embodiments, a request to schedule a notification specifies a recipient of the notification, a message for the notification, a time value that represents an amount of time after scheduling the notification in which to provide the notification, and one or more sets of interactions or events that causes the notification to be canceled. In response to the request, notification queue manager 125 sends interaction pattern manager 130 a request for a set of defined interaction patterns that corresponds to each set of interactions in the one or more sets of interactions or events that causes the notification to be canceled. In return, notification queue manager 125 may receive from interaction pattern manager 130 a unique ID associated with each set of defined interaction patterns. Next, notification queue manager 125 generates a pending notification that includes the recipient specified in the request, the message specified in the request, the unique ID(s) associated with the one or more sets of defined interaction patterns, a creation time that represents the time at which notification queue manager 125 generated the pending notification, and an expiration time that represents a sum of the creation time and the time value. Notification queue manager 125 then stores the pending notification in notification queue data storage 140.

Notification queue manager 125 may also be responsible for periodically (e.g., once a minute, once every five minutes, once every ten minutes, etc.) iterating through the pending notifications stored in notification queue data storage 140 to determine whether to process any pending notifications. While iterating through the pending notifications, if notification queue manager 125 determines that the expiration time specified for a particular pending notification has elapsed, notification queue manager 125 processes it by providing the message specified in the particular pending notification to the recipient specified in the particular pending notification.

In addition, notification queue manger 125 is configured to cancel pending notifications stored in notification queue data storage 140. For instance, notification queue manager 125 can receive from an application 110 an indication (e.g., a message) that a set of interactions have been performed on the application 110 and/or that a set of events have occurred in the application 110. In response, notification queue manager 125 may send interaction pattern manager 130 a request for a set of defined interaction patterns that corresponds to the set of interactions and/or the set of events. In return, notification queue manager 125 receives from interaction pattern manager 130 a unique ID associated with the set of defined interaction patterns. Notification queue manager 125 then iterates through the pending notifications stored in notification queue data storage 140 and cancels any pending notifications that have a unique ID associated with a set of defined interaction patterns that matches the unique ID notification queue manager 125 received from interaction pattern manager 130. In some embodiments, notification queue manager 125 cancels a particular pending notification by deleting it from notification queue data storage 140.

Interaction pattern manager 130 may be responsible for registering sets of defined interaction patterns. For example, interaction pattern manager 130 can receive from an application 110 a request to register a set of defined interaction patterns. In response to the request, interaction pattern manager 130 stores the set of defined interaction patterns in interaction pattern data storage 135. As explained above, in some embodiments, a set of defined interaction patterns may specify one or more interactions that can be performed on an application 110 and/or one or more events that can occur in an application 110.

Interaction pattern manager 130 also handles requests for sets of defined interaction patterns. For instance, interaction pattern manager 130 can receive from notification queue manager 125 a request for a set of defined interaction patterns that correspond to a particular set of interactions or a particular set of events. In response to the request, interaction pattern manager 130 accesses interaction pattern data storage 135 to check whether a set of defined interaction patterns exists that corresponds to the particular set of interactions or the particular set of events. If so, interaction pattern manager 130 determines the unique ID associated with the set of defined interaction patterns and sends it to notification queue manager 125. Otherwise, interaction pattern manager 130 sends notification queue manager 125 a message indicating that none exist.

An example operation of computing system 100 will now be described by reference to FIGS. 1-4. For this example, two sets of defined interaction patterns have been registered (e.g., by one or more applications 110). The two sets of defined interaction patterns are illustrated in FIG. 2. FIG. 2 illustrates a table 200 of example sets of defined interaction patterns according to some embodiments. In this example, table 200 is stored in interaction pattern data storage 135. As shown, table 200 includes columns 205-215. Column 205 is configured to store a unique ID associated with the respective set of defined interaction patterns. Column 210 is configured to store metadata associated with the set of defined interaction patterns. In some embodiments, the metadata stored in column 210 specifies a type of user interface layer (e.g., associated with a set of defined interaction patterns. Column 215 is configured to store the set of interactions and/or set of events for the set of defined interaction patterns as well as other associated information. In some embodiments, column 215 information associated with a set of interactions and/or set of events for a set of defined interaction patterns may include a name for the set of defined interaction patterns, a user interface framework (e.g., "jquery" for a jquery UI framework, "UIKit" for an iOS user interface framework, "android widget" for an Android user interface framework, etc.) for which the set of defined interaction patters is defined, a target of the set of defined interaction patterns, etc.

As illustrated in table 200, a set of defined interaction patterns 220 has a unique ID of "1," a web application user interface (e.g., "Application: ,webUI") as the user interface layer associated with the set of defined interaction patterns 220, an interaction pattern name of "Page_Refresh," and a page refresh event on a document for a jquery user interface framework as the set of interactions/events specified for the set of defined interaction patterns. Also, a set of defined interaction patterns 225 stored in table 200 has a unique ID of "2," a web application user interface (e.g., "Application: ,webUI") as the user interface layer associated with the set of defined interaction patterns 220, an interaction pattern name of "Click_Chat," and a click interaction on a chat window for a j query user interface framework as the set of interactions/events specified for the set of defined interaction patterns.

In this example, computing system 110 is a cloud computing system and applications 110a-110n are cloud messaging applications using for a jquery user interface framework. Through a client device (not shown), a first user of application 110a started application 110a and, though another client device (not shown), a second user of application 110b started application 110b. The second user initiated a conversation with the first user by sending the first user a message. In response to receiving the message from the second user, application 110a sends notification manager 120 a request to schedule a notification to remind the first user of application 110a to check the application 110a after five minutes have elapsed without refreshing a page (e.g., a chat window) of the application 110a or clicking on a chat window in the page of the application 110a. In this example, the request specifies a recipient of the notification as "john.doe@any.com", a message for the notification as "Please check your chat messages", a time value that represents an amount of time after scheduling the notification in which to provide the notification as five minutes, and a page refresh event for a jquery user interface framework in a web application user interface layer or a click interaction on a chat window for a j query user interface framework in a web application user interface layer as the set of interactions and events that may cause the notification to be canceled.

In response to the request, notification queue manager 125 sends interaction pattern manager 130 a request for sets of defined interaction patterns that correspond to a page refresh event on a page for a jquery user interface framework in a web application user interface layer and a click interaction on a chat window for a j query user interface framework in a web application user interface layer. When interaction pattern manager 130 receives the request, interaction pattern manager 130 accesses table 200 in interaction pattern data storage 135 to check whether sets of defined interaction patterns exists that correspond to a page refresh event on a page for a jquery user interface framework in a web application user interface layer and a click interaction on a chat window for a j query user interface framework in a web application user interface layer. For this example, interaction pattern manager 130 determines that they do exist and that the unique ID associated with them are "1" and "2," which interaction pattern manager 130 sends to notification queue manager 125.

Once notification queue manager 125 receives the unique IDs associated with each of the sets of defined interaction patterns, notification queue manager 125 generates a pending notification that includes the recipient specified in the request, the message specified in the request, the unique ID(s) associated with the one or more sets of defined interaction patterns, a creation time that represents the time at which notification queue manager 125 generated the pending notification, and an expiration time that represents a sum of the creation time and the time value of five minutes. Notification queue manager 125 then stores the pending notification in notification queue data storage 140.

FIG. 3 shows the pending notification that notification queue manager 125 generated and stored in notification queue data storage 140 for this example. In particular, FIG. 3 illustrates an example notification queue 300 according to some embodiments. As shown, notification queue 300 is implemented as a table with columns 305-330. Column 305 is configured to store a unique ID associated with a pending notification. Column 310 is configured to storage notification data associated with a pending notification (e.g., a recipient of the pending notification, a message for the pending notification, etc.). Column 315 is configured to store the time at which notification queue manager 125 generated a pending notification. Column 320 is configured to store an expiration time. Column 325 is configured to store unique IDs associated with sets of defined interaction patterns that may cause the pending notification to be canceled. Column 330 is configured to store a unique identifier associated with the application 110 that requested to schedule the notification. The pending notification that notification queue manager 125 generated in this example is pending notification 330, which includes the recipient and message specified in the request from application 110a, a creation time of Mar. 13, 2018 at 8:00 am, an expiration time of Mar. 13, 2018 at 8:05 am, defined interaction pattern IDs "1" and "2," and an application ID of "110a".

As illustrated in notification queue 300, pending notification 330 was created on Mar. 13, 2018 at 8:00 am. In this example, the first user of application 110a clicks on the chat window, which is in a web application user interface layer, provided by application 110a and sends a message to the second user of application 110b at 8:03 am. In response, user interface manager 115a translates the click on the chat window to be a click interaction on a chat window and sends notification manager 120 a message indicating that a click interaction on a chat window using a jquery user interface framework in a web application user interface layer occurred in application 110a.

Upon receiving the message, notification queue manager 125 sends interaction pattern manager 130 a request for a set of defined interaction patterns that corresponds to a click interaction on a chat window for a jquery user interface framework in a web application user interface layer. In response to the request, interaction pattern manager 130 accesses table 200 in interaction pattern data storage 135 to check whether a set of defined interaction patterns exists that corresponds to a click interaction on a chat window for a jquery user interface framework in a web application user interface layer. In this example, interaction pattern manager 130 determines that it does exist and that the unique ID associated with it is "2". Interaction pattern manager 130 then sends the unique ID to notification queue manager 125.

After notification queue manager 125 receives the unique ID, notification queue manager 125 accesses notification queue data storage 140 and iterates through the pending notifications to identify any pending notifications scheduled by application 110a that have a defined interaction pattern ID of "2". For this example, notification queue manager 130 identifies pending notification 330 as one such pending notification. Since one of the sets of conditions for canceling pending notification 335 has been satisfied, notification queue manager 130 deletes pending notification 335 from notification queue data storage 140 without processing it.

FIG. 4 illustrates the example notification queue 300 illustrated in FIG. 3 after a pending notification has been canceled according to some embodiments. Specifically, FIG. 3 shows notification queue 300 after notification queue manager 125 cancels pending notification 335 by deleting it from notification queue data storage 140. As shown, pending notification 335 is no longer in notification queue 300.

In this example, when application 110b receives the message from application 110a at 8:03 am on Mar. 13, 2018, application 110b sends notification manager 120 a request to schedule a notification to remind the second user of application 110b to check the application 110b after five minutes have elapsed without refreshing a page (e.g., a chat window) of the application 110b or clicking on a chat window of the page of the application 110b. The request in this example specifies a recipient of the notification as "jane.doe@any.com", a message for the notification as "Please check your chat messages", a time value that represents an amount of time after scheduling the notification in which to provide the notification as five minutes, and a page refresh event for a jquery user interface framework in a web application user interface layer or a click interaction on a chat window for a jquery user interface framework in a web application user interface layer as the set of interactions and events that may cause the notification to be canceled.

In response to the request from application 110b, notification queue manager 125 sends interaction pattern manager 130 a request for sets of defined interaction patterns that correspond to a page refresh event on a page for a jquery user interface framework in a web application user interface layer and a click interaction on a chat window for a jquery user interface framework in a web application user interface layer. Upon receiving the request, interaction pattern manager 130 accesses table 200 in interaction pattern data storage 135 to check whether sets of defined interaction patterns exists that correspond to a page refresh event on a page for a jquery user interface framework in a web application user interface layer and a click interaction on a chat window for a jquery user interface framework in a web application user interface layer. In this example, interaction pattern manager 130 determines that they do exist and that the unique ID associated with them are "1" and "2". Interaction pattern manager 130 sends the unique IDs to notification queue manager 125.

After receiving the unique IDs, notification queue manager 125 generates a pending notification that includes the recipient specified in the request, the message specified in the request, the unique ID(s) associated with the one or more sets of defined interaction patterns, a creation time that represents the time at which notification queue manager 125 generated the pending notification, and an expiration time that represents a sum of the creation time and the time value of five minutes. Notification queue manager 125 then stores the pending notification in notification queue data storage 140.

Referring back to FIG. 4, notification queue 300 of FIG. 4 shows the pending notification that notification queue manager 125 generated and stored in notification queue data storage 140 for this example. Specifically, notification queue 300 includes pending notification 340, which notification queue manager 125 generated for this example. As illustrated, pending notification 340 includes the recipient and message specified in the request from application 110b, a creation time of Mar. 13, 2018 at 8:03 am, an expiration time of Mar. 13, 2018 at 8:08 am, defined interaction pattern IDs "1" and "2," and an application ID of "110b".

For this example, the second user of application 110b has not refreshed the chat window of application 110b nor clicked on the chat window of application 110b since the time application 110b received the message from application 110a. Additionally, at 8:10 am on Mar. 13, 2018, notification queue manager 125 begins iterating through notification queue 300 to determine whether to process any pending notifications. Upon examining pending notification 340, notification queue manager 125 determines that the expiration time specified for pending notification 340 has elapsed. Thus, notification queue manager 125 processes pending notification 340 by sending a notification to jane.doe@any.com with the message of "Please check your chat messages". Then, notification queue manager 125 deletes pending notification 340 from notification queue 300.

Figure 5:
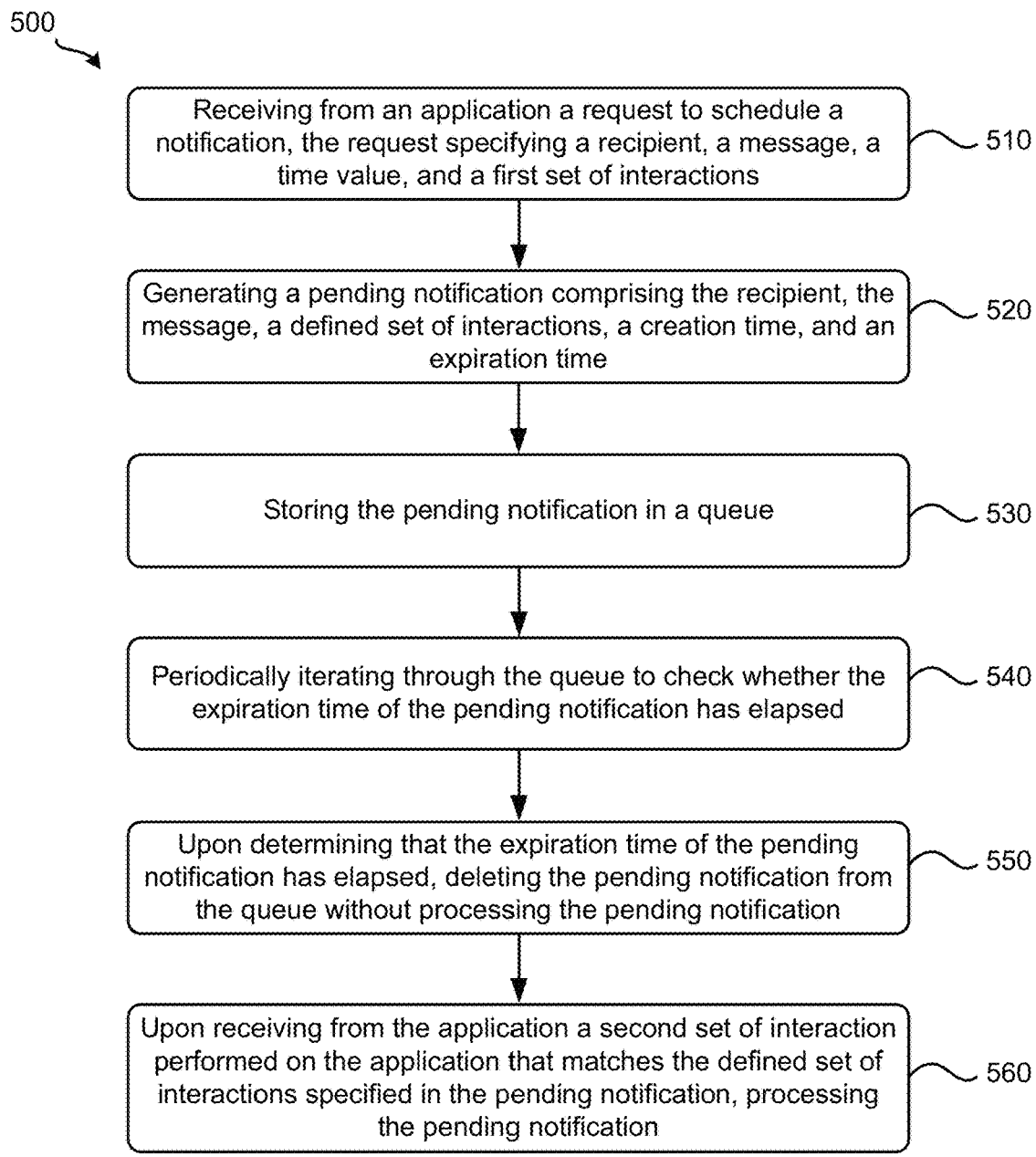
FIG. 5 illustrates a process for providing notifications according to some embodiments.

FIG. 5 illustrates a process 500 for providing notifications according to some embodiments. In some embodiments, notification manager 120 performs process 500. Process 500 starts by receiving, at 510, from an application, a request to schedule a notification. The request may include a recipient, a message, a time value, and a first set of interactions. Referring to FIG. 1 as an example, notification queue manager 125 may receive such a request from an application 110.

Next, process 500 generates, at 520, a pending notification that includes the recipient, the message, a defined set of interactions that corresponds to the first set of interactions, a creation time that represents a time at which the pending notification is generated, and an expiration time that represents a sum of the creation time and the time value. Referring to FIGS. 1 and 3 as an example, notification queue manager 125 can generate pending notification 335. In some embodiments, notification queue manager 125 sends interaction pattern manager 130 a request for a defined set of interactions that corresponds to the first set of interactions. In response, interaction pattern manager 130 accesses interaction pattern data storage 135 to check whether a set of defined interaction patterns exists that corresponds to the first set of interactions. In this example, interaction pattern manager 130 determines that such a set of defined interaction patterns does exist. Interaction pattern manager 130 then determines the unique ID associated with the set of defined interaction patterns and sends it to notification queue manager 125.

Process 500 then stores, at 530, the pending notification in a queue. Referring to FIGS. 1 and 3 as an example, notification queue manager 125 can store pending notification 335 in notification queue 300. Next, process 500 periodically iterates, at 540, through the queue to check whether the expiration time of the pending notification has elapsed. Upon determining that the expiration time of the pending notification has elapsed, process 500 deletes, at 550, the pending notification from the queue without processing the pending notification. Upon receiving from the application a second set of interactions performed on the application that matches the defined set of interactions specified in the pending notification, process 500 processes, at 560, the pending notification. In some embodiments, process 500 processes the pending notification by sending the recipient specified in the pending notification a notification that includes the message specified in the pending notification.

Figure 6:
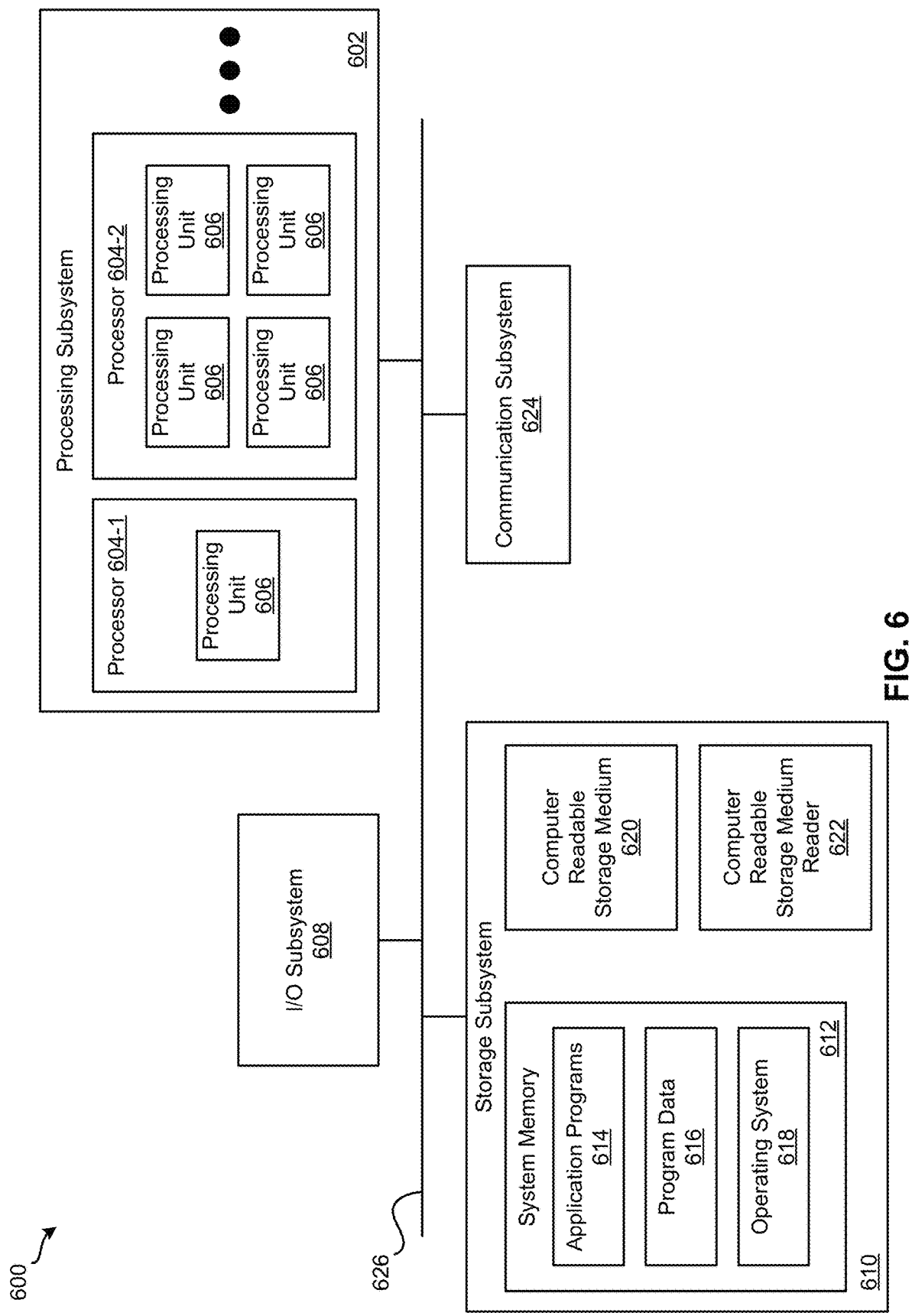
FIG. 6 illustrates an exemplary computer system, in which various embodiments may be implemented.

FIG. 6 illustrates an exemplary computer system 600 for implementing various embodiments described above. For example, computer system 600 may be used to implement computing system 60. Computer system 600 may be a desktop computer, a laptop, a server computer, or any other type of computer system or combination thereof. Some or all elements of applications 110a-110n, user interface managers 115a-115n, notification manager 120, notification queue manager 125, interaction pattern manager 130, or combinations thereof can be included or implemented in computer system 600. In addition, computer system 600 can implement many of the operations, methods, and/or processes described above (e.g., process 500). As shown in FIG. 6, computer system 600 includes processing subsystem 602, which communicates, via bus subsystem 626, with input/output (I/O) subsystem 608, storage subsystem 610 and communication subsystem 624.

Bus subsystem 626 is configured to facilitate communication among the various components and subsystems of computer system 600. While bus subsystem 626 is illustrated in FIG. 6 as a single bus, one of ordinary skill in the art will understand that bus subsystem 626 may be implemented as multiple buses. Bus subsystem 626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities, such as the functionalities described above by reference to process 500, etc.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614 (e.g., applications 110a-110n), program data 616, and operating system (OS) 618. OS 618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 620 may be a non-transitory computer-readable medium configured to store software (e.g., programs, code modules, data constructs, instructions, etc.). Many of the components (e.g., applications 110a-110n, user interface managers 115a-115n, notification manager 120, notification queue manager 125, and interaction pattern manager 130) and/or processes (e.g., process 500) described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
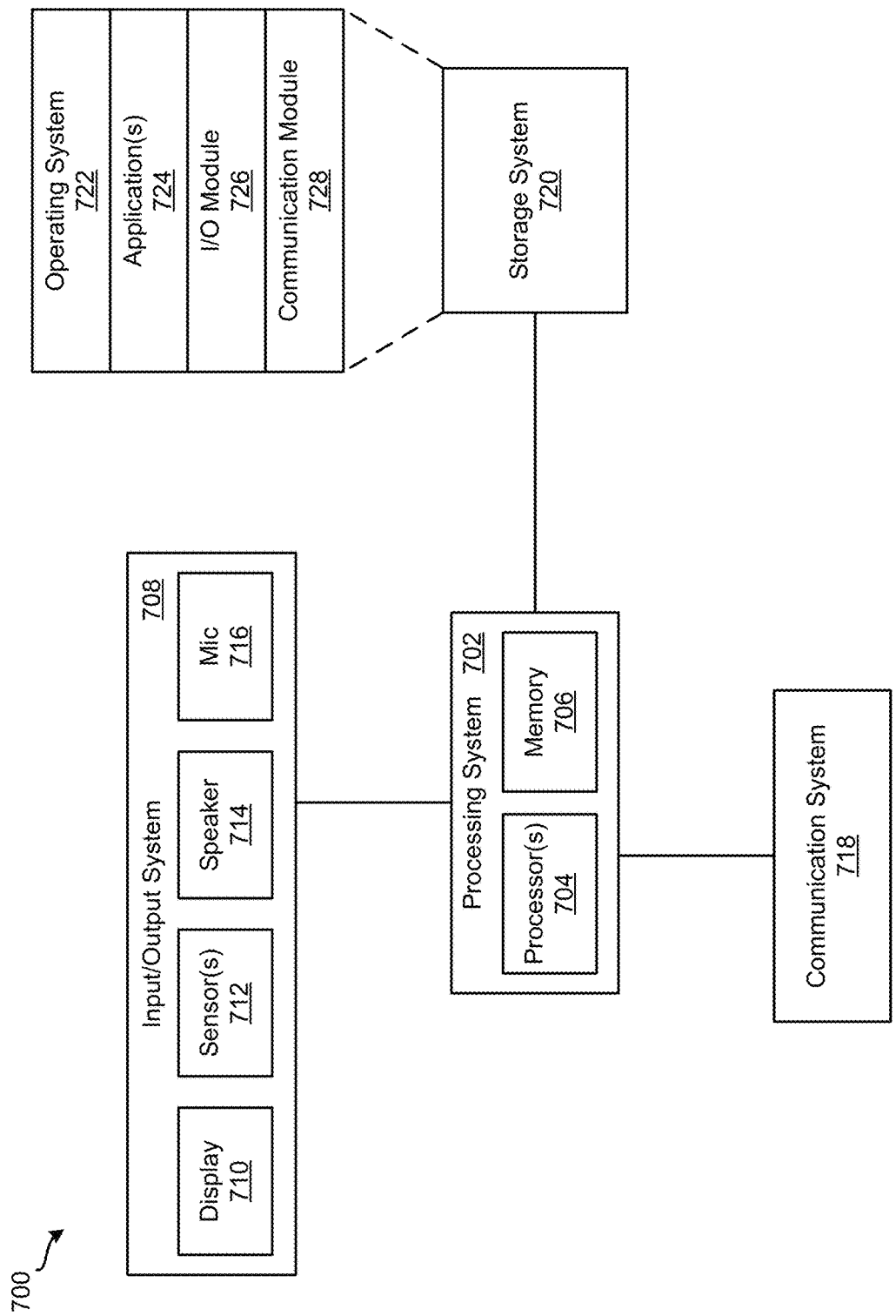
FIG. 7 illustrates an exemplary computing device, in which various embodiments may be implemented.

FIG. 7 illustrates an exemplary computing device 700 for implementing various embodiments described above. For example, computing device 700 may be used to implement computing system 100. Computing device 700 may be a cellphone, a smartphone, a wearable device, an activity tracker or manager, a tablet, a personal digital assistant (PDA), a media player, or any other type of mobile computing device or combination thereof. Some or all elements of applications 110a-110n, user interface managers 115a-115n, notification manager 120, notification queue manager 125, interaction pattern manager 130, or combinations thereof can be included or implemented in computing device 700. In addition, computing device 700 can implement many of the operations, methods, and/or processes described above (e.g., process 500). As shown in FIG. 7, computing device 700 includes processing system 702, input/output (I/O) system 708, communication system 718, and storage system 720. These components may be coupled by one or more communication buses or signal lines.

Processing system 702, which can be implemented as one or more integrated circuits (e.g., a conventional microprocessor or microcontroller), controls the operation of computing device 700. As shown, processing system 702 includes one or more processors 704 and memory 706. Processors 704 are configured to run or execute various software and/or sets of instructions stored in memory 706 to perform various functions for computing device 700 and to process data.

Each processor of processors 704 may include one processing unit (e.g., a single core processor) or several processing units (e.g., a multicore processor). In some embodiments, processors 704 of processing system 702 may be implemented as independent processors while, in other embodiments, processors 704 of processing system 702 may be implemented as multiple processors integrate into a single chip. Still, in some embodiments, processors 704 of processing system 702 may be implemented as a combination of independent processors and multiple processors integrated into a single chip.

Memory 706 may be configured to receive and store software (e.g., operating system 722, applications 724, I/O module 726, communication module 728, etc. from storage system 720) in the form of program instructions that are loadable and executable by processors 704 as well as data generated during the execution of program instructions. In some embodiments, memory 706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 708 is responsible for receiving input through various components and providing output through various components. As shown for this example, I/O system 708 includes display 710, one or more sensors 712, speaker 714, and microphone 716. Display 710 is configured to output visual information (e.g., a graphical user interface (GUI) generated and/or rendered by processors 704). In some embodiments, display 710 is a touch screen that is configured to also receive touch-based input. Display 710 may be implemented using liquid crystal display (LCD) technology, light-emitting diode (LED) technology, organic LED (OLED) technology, organic electro luminescence (OEL) technology, or any other type of display technologies. Sensors 712 may include any number of different types of sensors for measuring a physical quantity (e.g., temperature, force, pressure, acceleration, orientation, light, radiation, etc.). Speaker 714 is configured to output audio information and microphone 716 is configured to receive audio input. One of ordinary skill in the art will appreciate that I/O system 708 may include any number of additional, fewer, and/or different components. For instance, I/O system 708 may include a keypad or keyboard for receiving input, a port for transmitting data, receiving data and/or power, and/or communicating with another device or component, an image capture component for capturing photos and/or videos, etc.

Communication system 718 serves as an interface for receiving data from, and transmitting data to, other devices, computer systems, and networks. For example, communication system 718 may allow computing device 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 718 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 718 may provide components configured for wired communication (e.g., Ethernet) in addition to or instead of components configured for wireless communication.

Storage system 720 handles the storage and management of data for computing device 700. Storage system 720 may be implemented by one or more non-transitory machine-readable mediums that are configured to store software (e.g., programs, code modules, data constructs, instructions, etc.) and store data used for, or generated during, the execution of the software. Many of the components (e.g., applications 110*a*-110*n*, user interface managers 115*a*-115*n*, notification manager 120, notification queue manager 125, and interaction pattern manager 130) and/or processes (e.g., process 500) described above may be implemented as software that when executed by a processor or processing unit (e.g., processors 704 of processing system 702) performs the operations of such components and/or processes.

In this example, storage system 720 includes operating system 722, one or more applications 724, I/O module 726, and communication module 728. Operating system 722 includes various procedures, sets of instructions, software components and/or drivers for controlling and managing general system tasks (e.g., memory management, storage device control, power management, etc.) and facilitates communication between various hardware and software components. Operating system 722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 724 can include any number of different applications installed on computing device 700. For example, applications 110*a*-110*n* may be installed on computing device 700. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 726 manages information received via input components (e.g., display 710, sensors 712, and microphone 716) and information to be outputted via output components (e.g., display 710 and speaker 714). Communication module 728 facilitates communication with other devices via communication system 718 and includes various software components for handling data received from communication system 718.

One of ordinary skill in the art will realize that the architecture shown in FIG. 7 is only an example architecture of computing device 700, and that computing device 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
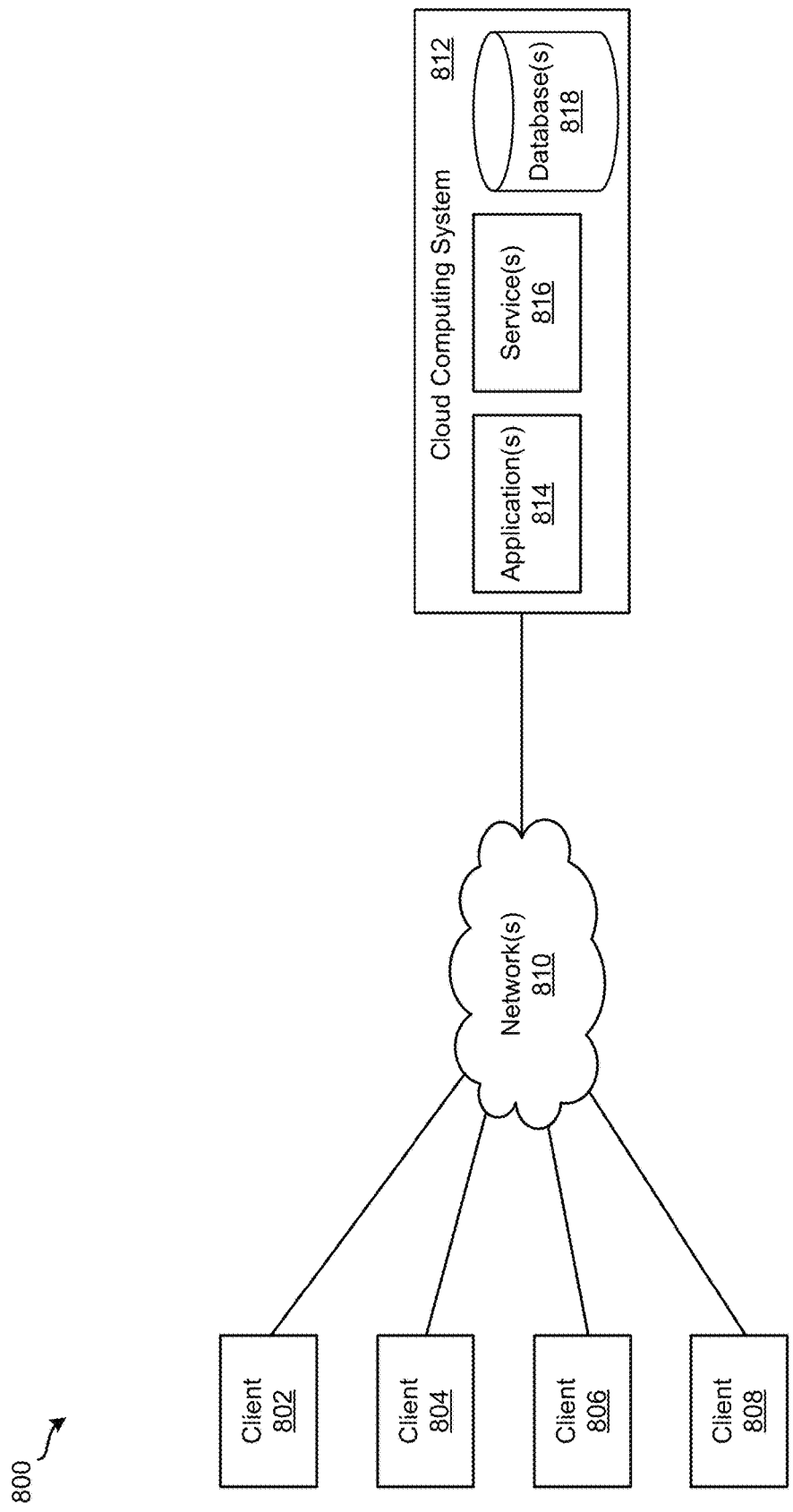
FIG. 8 illustrates an exemplary system, in which various embodiments may be implemented.

FIG. 8 illustrates an exemplary system 800 for implementing various embodiments described above. For example, cloud computing system 812 of system 800 may be used to implement computing system 100. As shown, system 800 includes client devices 802-808, one or more networks 810, and cloud computing system 812. Cloud computing system 812 is configured to provide resources and data to client devices 802-808 via networks 810. In some embodiments, cloud computing system 800 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 includes one or more applications 814, one or more services 816, and one or more databases 818. Cloud computing system 800 may provide applications 814, services 816, and databases 818 to any number of different customers in a self-service, subscription-based, elastically scalable, reliable, highly available, and secure manner.

In some embodiments, cloud computing system 800 may be adapted to automatically provision, manage, and track a customer's subscriptions to services offered by cloud computing system 800. Cloud computing system 800 may provide cloud services via different deployment models. For example, cloud services may be provided under a public cloud model in which cloud computing system 800 is owned by an organization selling cloud services and the cloud services are made available to the general public or different industry enterprises. As another example, cloud services may be provided under a private cloud model in which cloud computing system 800 is operated solely for a single organization and may provide cloud services for one or more entities within the organization. The cloud services may also be provided under a community cloud model in which cloud computing system 800 and the cloud services provided by cloud computing system 800 are shared by several organizations in a related community. The cloud services may also be provided under a hybrid cloud model, which is a combination of two or more of the aforementioned different models.

In some instances, any one of applications 814, services 816, and databases 818 made available to client devices 802-808 via networks 810 from cloud computing system 800 is referred to as a "cloud service." Typically, servers and systems that make up cloud computing system 800 are different from the on-premises servers and systems of a customer. For example, cloud computing system 800 may host an application and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transport protocol) server applications, FTP (file transfer protocol) server applications, CGI (common gateway interface) server applications, JAVA server applications, etc.). Services 816 are software components, modules, application, etc. that are configured to execute on cloud computing system 812 and provide functionalities to client devices 802-808 via networks 810. Services 816 may be web-based services or on-demand cloud services.

Databases 818 are configured to store and/or manage data that is accessed by applications 814, services 816, and/or client devices 802-808. For instance, storages 135 and 140 may be stored in databases 818. Databases 818 may reside on a non-transitory storage medium local to (and/or resident in) cloud computing system 812, in a storage-area network (SAN), on a non-transitory storage medium local located remotely from cloud computing system 812. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. That is, in some such embodiments, data for databases 818 are stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 800. Client devices 802-808 may be computer system 600 or computing device 700, as described above by reference to FIGS. 6 and 7, respectively. Although system 800 is shown with four client devices, any number of client devices may be supported.

Networks 810 may be any type of network configured to facilitate data communications among client devices 802-808 and cloud computing system 812 using any of a variety of network protocols. Networks 810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving, from an application, a request to schedule a notification, the request comprising a recipient, a message, a time value, and a first set of interactions;
   generating a pending notification comprising the recipient, the message, a defined set of interactions that corresponds to the first set of interactions, a creation time that represents a time at which the pending notification is generated, and an expiration time that represents a sum of the creation time and the time value;
   storing the pending notification in a queue;
   periodically iterating through the queue to check whether the expiration time of the pending notification has elapsed;
   upon receiving from the application a second set of interactions performed on the application that matches the defined set of interactions specified in the pending notification, deleting the pending notification from the queue without processing the pending notification; and
   upon determining that the expiration time of the pending notification has elapsed, processing the pending notification by sending the recipient specified in the pending notification a notification comprising the message specified in the pending notification.

2. The non-transitory machine-readable medium of claim 1, wherein the program further comprises a set of instructions for, in response to the request, accessing a storage configured to store defined sets of interactions to identify the defined set of interactions that corresponds to the first set of interactions and determining a unique identifier associated with the defined set of interactions, wherein the defined set of interactions included in the pending notification is the determined unique identifier associated with the defined set of interactions.

3. The non-transitory machine-readable medium of claim 2, wherein the program further comprises a set of instructions for determining that the second set of interactions performed on the application matches the defined set of interactions.

4. The non-transitory machine-readable medium of claim 3, wherein the unique identifier is a first unique identifier, wherein the defined set of interactions is a first defined set of interactions, wherein determining that the second set of interactions performed on the application matches the defined set of interactions comprises:
  accessing the storage to identify a second defined set of interactions that corresponds to the second set of interactions;
  determining a second unique identifier associated with the second defined set of interactions; and
  determining that the second unique identifier matches the first unique identifier.

5. The non-transitory machine-readable medium of claim 1, wherein the request to schedule the notification is a first request to schedule a first notification, wherein the recipient is a first recipient, wherein the message is a first message, wherein the time value is a first time value, wherein the pending notification is a first pending notification, wherein the defined set of interactions is a first defined set of interactions, wherein the creation time is a first creation time, wherein the expiration time is a first expiration time, wherein the notification is a first notification, wherein the program further comprises sets of instructions for:
  receiving, from the application, a second request to schedule a second notification, the second request comprising a second recipient, a second message, a second time value, and a third set of interactions;
  generating a second pending notification comprising the second recipient, the second message, a second defined set of interactions that corresponds to the third set of interactions, a second creation time that represents a time at which the second pending notification is generated, a second expiration time that represents a sum of the second creation time and the second time value;
  storing the second pending notification in the queue;
  periodically iterating through the queue to check whether the second expiration time of the second pending notification has elapsed;
  upon receiving from the application a fourth set of interactions performed on the application that matches the second defined set of interactions specified in the second pending notification, deleting the second pending notification from the queue without processing the second pending notification; and
  upon determining that the second expiration time of the second pending notification has elapsed, processing the second pending notification by sending the second recipient specified in the second pending notification a second notification comprising the second message specified in the second pending notification.

6. The non-transitory machine-readable medium of claim 1, wherein the request further comprises a third set of interactions; wherein the defined set of interactions is a first defined set of interactions, wherein the pending notification further comprises a second defined set of interactions that corresponds to the third set of interactions, wherein the program further comprises a set of instructions for, upon receiving from the application the second set of interactions performed on the application that matches the second defined set of interactions specified in the pending notification, deleting the pending notification from the queue without processing the pending notification.

7. The non-transitory machine-readable medium of claim 1, wherein the application is a first application, wherein the program further comprises sets of instructions for:
  receiving from a second application a set of interaction definitions, each interaction definition in the set of interaction definitions comprising a set of interactions and metadata associated with the set of interactions; and
  storing the set of interaction definitions in a storage.

8. A method comprising:
  receiving, from an application, a request to schedule a notification, the request comprising a recipient, a message, a time value, and a first set of interactions;
  generating a pending notification comprising the recipient, the message, a defined set of interactions that corresponds to the first set of interactions, a creation time that represents a time at which the pending notification is generated, and an expiration time that represents a sum of the creation time and the time value;
  storing the pending notification in a queue;
  periodically iterating through the queue to check whether the expiration time of the pending notification has elapsed;
  upon receiving from the application a second set of interactions performed on the application that matches the defined set of interactions specified in the pending notification, deleting the pending notification from the queue without processing the pending notification; and
  upon determining that the expiration time of the pending notification has elapsed, processing the pending notification by sending the recipient specified in the pending notification a notification comprising the message specified in the pending notification.

9. The method of claim 8 further comprising, in response to the request, accessing a storage configured to store defined sets of interactions to identify the defined set of interactions that corresponds to the first set of interactions and determining a unique identifier associated with the defined set of interactions, wherein the defined set of interactions included in the pending notification is the determined unique identifier associated with the defined set of interactions.

10. The method of claim 9 further comprising determining that the second set of interactions performed on the application matches the defined set of interactions.

11. The method of claim 10, wherein the unique identifier is a first unique identifier, wherein the defined set of interactions is a first defined set of interactions, wherein determining that the second set of interactions performed on the application matches the defined set of interactions comprises:
  accessing the storage to identify a second defined set of interactions that corresponds to the second set of interactions;
  determining a second unique identifier associated with the second defined set of interactions; and
  determining that the second unique identifier matches the first unique identifier.

12. The method of claim 8, wherein the request to schedule the notification is a first request to schedule a first notification, wherein the recipient is a first recipient, wherein the message is a first message, wherein the time value is a first time value, wherein the pending notification is a first pending notification, wherein the defined set of interactions is a first defined set of interactions, wherein the creation time is a first creation time, wherein the expiration time is a first expiration time, wherein the notification is a first notification, wherein the method further comprises:
  receiving, from the application, a second request to schedule a second notification, the second request comprising a second recipient, a second message, a second time value, and a third set of interactions;
  generating a second pending notification comprising the second recipient, the second message, a second defined set of interactions that corresponds to the third set of interactions, a second creation time that represents a time at which the second pending notification is generated, a second expiration time that represents a sum of the second creation time and the second time value;

storing the second pending notification in the queue;

periodically iterating through the queue to check whether the second expiration time of the second pending notification has elapsed;

upon receiving from the application a fourth set of interactions performed on the application that matches the second defined set of interactions specified in the second pending notification, deleting the second pending notification from the queue without processing the second pending notification; and upon determining that the second expiration time of the second pending notification has elapsed, processing the second pending notification by sending the second recipient specified in the second pending notification a second notification comprising the second message specified in the second pending notification.

13. The method of claim 8, wherein the request further comprises a third set of interactions; wherein the defined set of interactions is a first defined set of interactions, wherein the pending notification further comprises a second defined set of interactions that corresponds to the third set of interactions, wherein the method further comprises upon receiving from the application the second set of interactions performed on the application that matches the second defined set of interactions specified in the pending notification, deleting the pending notification from the queue without processing the pending notification.

14. The method of claim 8, wherein the application is a first application, wherein the method further comprises:

receiving from a second application a set of interaction definitions, each interaction definition in the set of interaction definitions comprising a set of interactions and metadata associated with the set of interactions; and storing the set of interaction definitions in a storage.

15. A system comprising:

a set of processing units; and a non-transitory machine-readable medium storing instructions that when executed by at least one processing unit in the set of processing units cause the at least one processing unit to:

receive, from an application, a request to schedule a notification, the request comprising a recipient, a message, a time value, and a first set of interactions;

generate a pending notification comprising the recipient, the message, a defined set of interactions that corresponds to the first set of interactions, a creation time that represents a time at which the pending notification is generated, and an expiration time that represents a sum of the creation time and the time value;

store the pending notification in a queue;

periodically iterate through the queue to check whether the expiration time of the pending notification has elapsed;

upon receiving from the application a second set of interactions performed on the application that matches the defined set of interactions specified in the pending notification, delete the pending notification from the queue without processing the pending notification; and upon determining that the expiration time of the pending notification has elapsed, process the pending notification by sending the recipient specified in the pending notification a notification comprising the message specified in the pending notification.

16. The system of claim 15, wherein the instructions further cause the at least one processing units to, in response to the request, access a storage configured to store defined sets of interactions to identify the defined set of interactions that corresponds to the first set of interactions and determine a unique identifier associated with the defined set of interactions, wherein the defined set of interactions included in the pending notification is the determined unique identifier associated with the defined set of interactions.

17. The system of claim 16, wherein the instructions further cause the at least one processing unit to determine that the second set of interactions performed on the application matches the defined set of interactions.

18. The system of claim 17, wherein the unique identifier is a first unique identifier, wherein the defined set of interactions is a first defined set of interactions, wherein determining that the second set of interactions performed on the application matches the defined set of interactions comprises:

accessing the storage to identify a second defined set of interactions that corresponds to the second set of interactions;

determining a second unique identifier associated with the second defined set of interactions; and determining that the second unique identifier matches the first unique identifier.

19. The system of claim 15, wherein the request to schedule the notification is a first request to schedule a first notification, wherein the recipient is a first recipient, wherein the message is a first message, wherein the time value is a first time value, wherein the pending notification is a first pending notification, wherein the defined set of interactions is a first defined set of interactions, wherein the creation time is a first creation time, wherein the expiration time is a first expiration time, wherein the notification is a first notification, wherein the instructions further cause the at least one processing unit to:

receive, from the application, a second request to schedule a second notification, the second request comprising a second recipient, a second message, a second time value, and a third set of interactions;

generate a second pending notification comprising the second recipient, the second message, a second defined set of interactions that corresponds to the third set of interactions, a second creation time that represents a time at which the second pending notification is generated, a second expiration time that represents a sum of the second creation time and the second time value;

store the second pending notification in the queue;

periodically iterate through the queue to check whether the second expiration time of the second pending notification has elapsed;

upon receiving from the application a fourth set of interactions performed on the application that matches the second defined set of interactions specified in the second pending notification, delete the second pending notification from the queue without processing the second pending notification; and upon determining that the second expiration time of the second pending notification has elapsed, process the second pending notification by sending the second recipient specified in the second pending notification a second notification comprising the second message specified in the second pending notification.

20. The system of claim 15, wherein the request further comprises a third set of interactions; wherein the defined set of interactions is a first defined set of interactions, wherein the pending notification further comprises a second defined set of interactions that corresponds to the third set of interactions, wherein the instructions further cause the at least one processing unit to, upon receiving from the application the second set of interactions performed on the application that matches the second defined set of interactions specified in the pending notification, deleting the pending notification from the queue without processing the pending notification.

* * * * *